Figure 1:
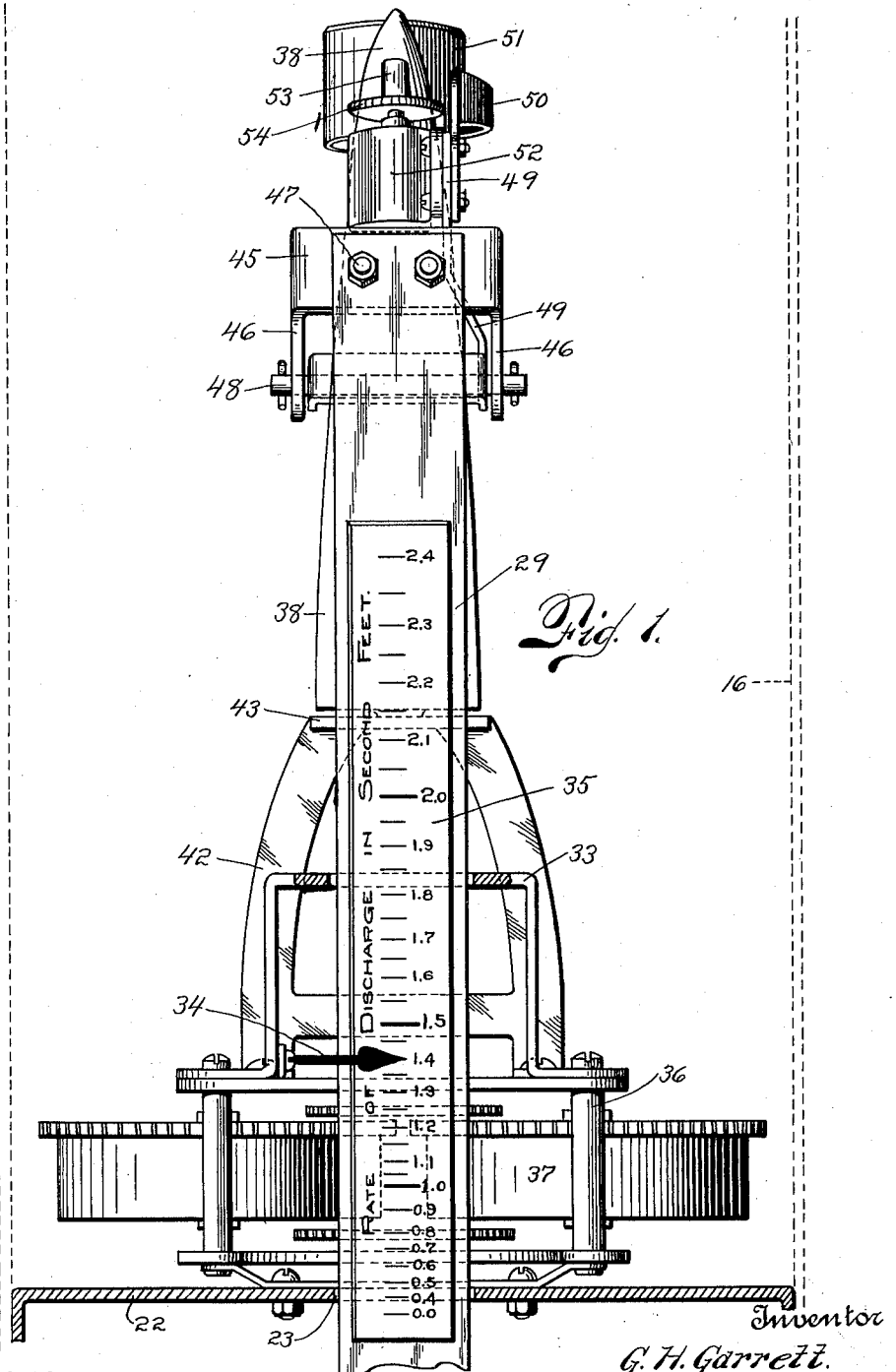

G. H. GARRETT.
WATER METER.
APPLICATION FILED OCT. 27, 1919.

1,413,980.

Patented Apr. 25, 1922.
3 SHEETS—SHEET 2.

Witnesses
John B. Cade.

Inventor
G. H. Garrett.
by Wilkinson & Giusta
his Attorneys

G. H. GARRETT.
WATER METER.
APPLICATION FILED OCT. 27, 1919.

1,413,980.

Patented Apr. 25, 1922.

3 SHEETS—SHEET 3.

Witnesses
John B. Dade

Inventor
G. H. Garrett
by Wilkinson & Giusta
his Attorneys

UNITED STATES PATENT OFFICE.

GAIRALD H. GARRETT, OF DENVER, COLORADO.

WATER METER.

1,413,980. Specification of Letters Patent. Patented Apr. 25, 1922.

Application filed October 27, 1919. Serial No. 333,448.

*To all whom it may concern:*

Be it known that I, GAIRALD H. GARRETT, a citizen of the United States, residing at the city and county of Denver and State of Colorado, have invented certain new and useful Improvements in Water Meters; and I do hereby declare the following to be a full, clear, and exact description of the invention, such as will enable others skilled in the art to which it appertains to make and use the same.

This invention embodies improvements in that type of water meters which are more particularly designed for measuring the delivery of water through the branch service conduits of irrigation systems, although in some of its novel phases the same might also be satisfactorily adopted in other analogous relations and possibly with other flowing liquids, as for instance in the case of large oil conducting systems.

It is believed to be understood that irrigation engineers have generally adopted the terms of "second-foot" and of "acre-foot" as the units of measurement for flowing water, which involves both volume and time, a second of time being accepted as the unit of time and a cubic foot of water as the unit of volume. The resultant of a unit of volume as measured by a unit of time has been termed a "second-foot", and the "rate of flow" is computed in second-feet by ascertaining the number of units of volume that pass a given cross-section of the conduit in a unit of time, while the "acre-foot" is the volume of water required to cover one acre of ground with water one foot deep. It is also generally understood that flowing water, through irrigation branch service conduits, open canals or the like, is measured by the variation in its "head", whether that "head" be the crest of water, flowing over a weir, or is the difference between the water levels on the upper and lower sides of the measuring position, when no actual overflow fall exists as occurs in the wier form of damming.

Viewed from the aspect of these prefacing remarks, the primary object of the instant invention has been to devise improved automatically operating measuring mechanism, comprising a minimum number of directly co-operating parts, embodying generically a time controlled variant drive element and a float controlled rectilinearly operative bar carrying a suitable counter device, which latter is shiftable as a bodily whole, and a constant fixture of said bar, with its actuating disk associated with said variant drive element, whereby the novelly combined arrangement will properly function in a simple and positive manner, and in entire avoidance of the undesirable usage of sheaves, cables or other loosely mounted connection elements, so that the counter device will permanently register the acre-feet of water delivered to the consumer while the reciprocating bar, directly carrying the counter device as an entirety, may additionally function as a properly computed scale element to indicate at any time the variable rate of flow, or rate of discharge, in second-feet past the measuring position.

Another object of the invention is to provide such a measuring device which is durable and accurately efficient in action, being also inaccessible to unauthorized persons, and which is simple in construction, assembly and operation,—hence comparatively inexpensive to manufacture, install or repair.

Other objects and advantages will be so apparent, as incidental to the following disclosure, that it would only be undesirable surplusage to further refer to the same initially, and reference will now be had to the accompanying drawings, for a clearer conception of the improvements more succinctly set forth in the appended claims, in which drawings—

Figure 2:
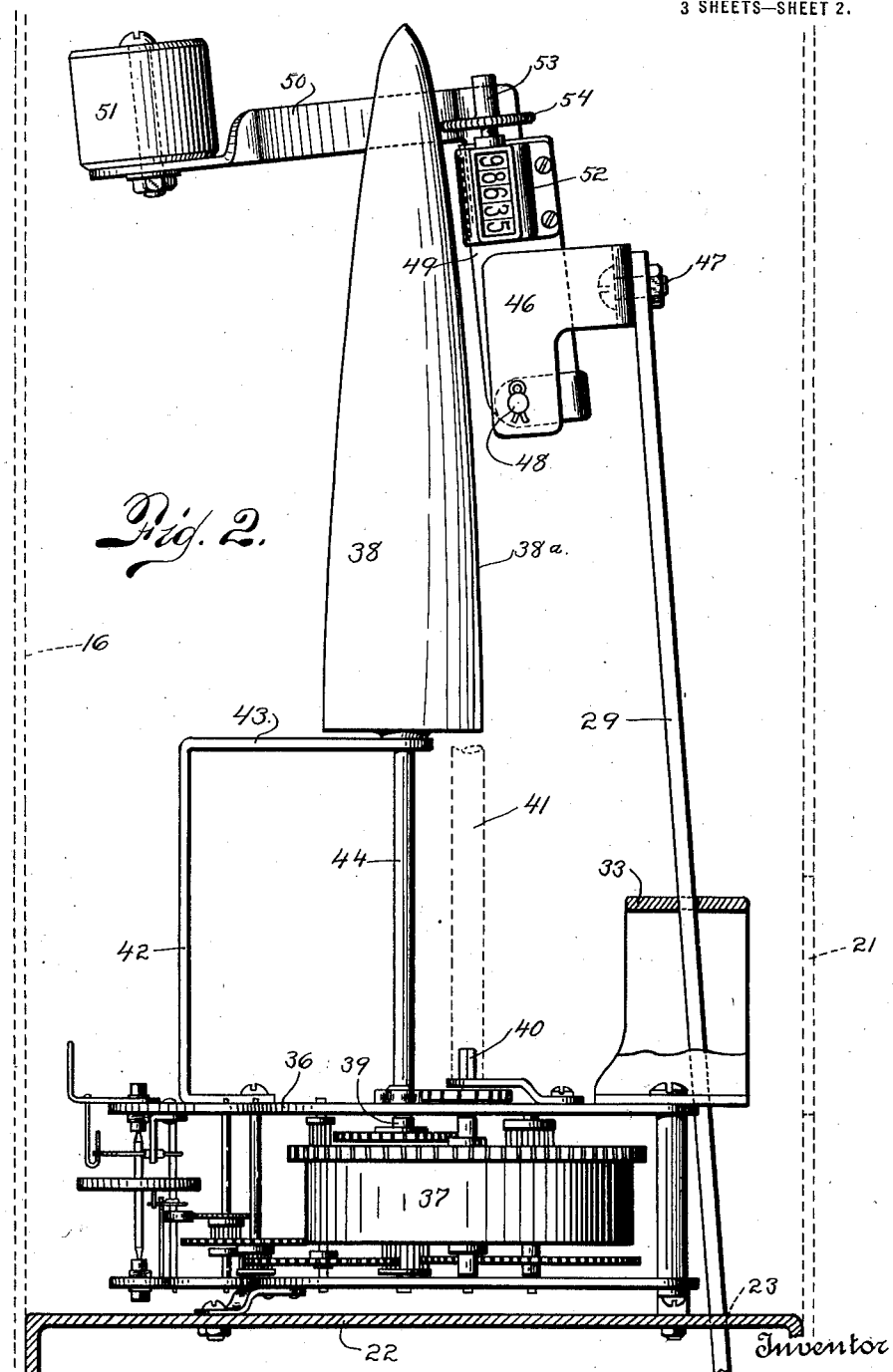
Figure 3:
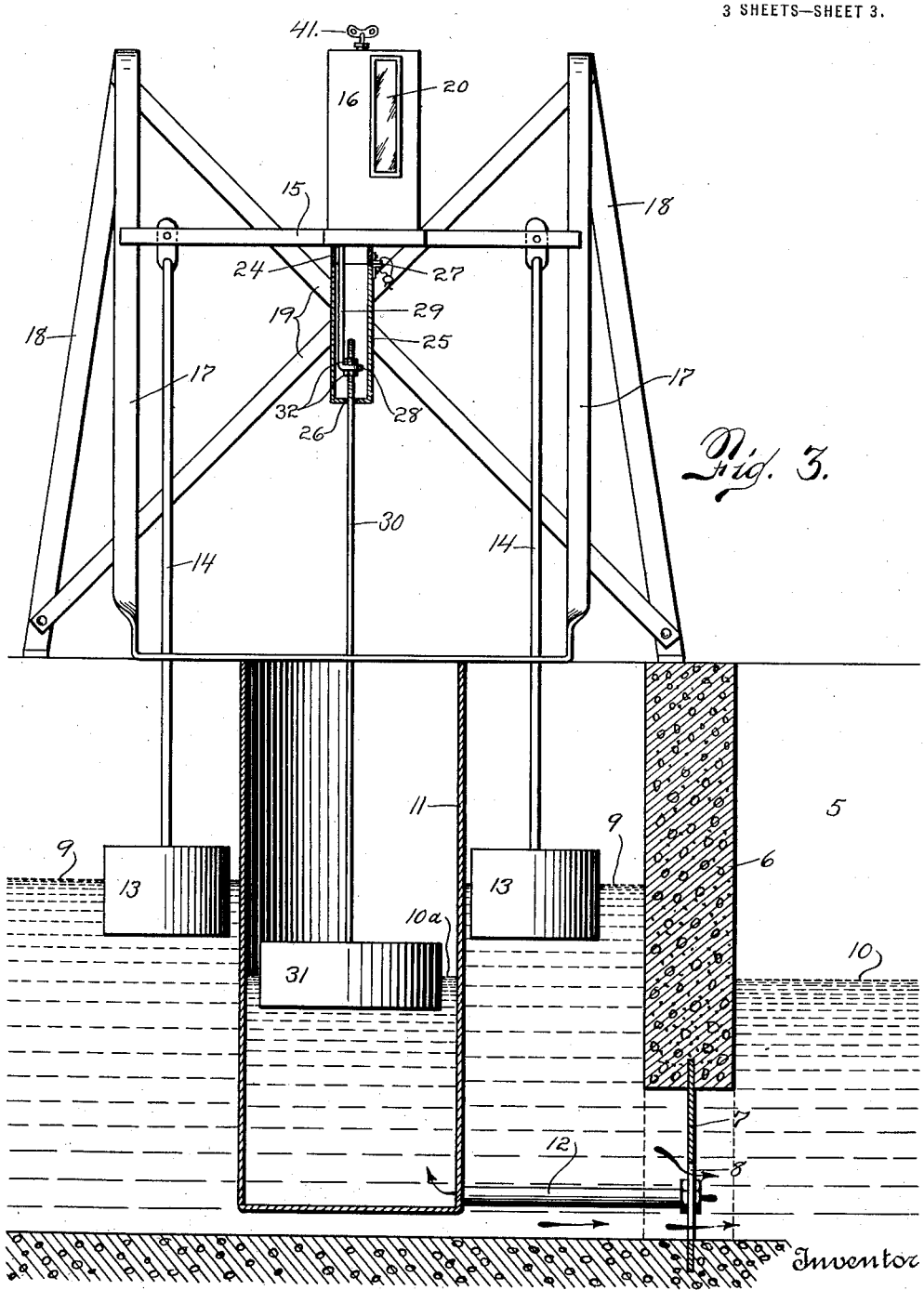

Figure 1 is an elevational view in detail, of the interior mechanism of the meter box, looking towards the graduated face of the scale bar for indicating the variable flow of water in second feet: Figure 2 is an analogous view taken at right angles to Fig. 1, and looking towards the exposed numerals of the counter device for registering the quantitative volume of water in acre-feet: and Figure 3 is an elevational view illustrating the adaption of my improvements to a branch conduit of an irregation system, wherein the flow of water through the service ditch or canal is controlled by what is technically known as a submerged orifice arrangement.

It may be said at the outset that, by minor changes in the disposition and arrangement of the co-operating elements of my improvements, the same may be adapted for use with any of the well known canal constructions embodying submerged controlling orifices, wiers, Venturi sections or any equivalent means of damming, whereby water can be measured by the amount of "head" lost, and this without in any way departing from the spirit of the invention or affecting the major combinations claimed; but for the purpose of simplicity of disclosure and brevity of description I shall only show and explain the improvements as particularly applied to a submerged orifice arrangement, as illustrating one practical embodiment of the invention and a preferred installation of the same.

5 designates one bank of a branch service open canal or ditch, across which extends a dam 6, of suitable structure and material, provided at its lower edge face with a metallic extension 7, depending below the bed of the stream and having an orifice 8 therethrough, adapted to be submerged by the bodies of water above and below the dam structure.

The level of the water upstream from the dam is indicated at 9 while that of the downstream level is indicated at 10, and it is obvious that these levels 9 and 10, respectively, would also be maintained in a chambered "water stilling" well located outside of the zone of the stream itself (if the employment of such a chambered well should be desired) by pipe conduits leading thereto from the bodies of water upstream and downstream.

As shown in the drawings, 11 designates a partially submerged tank or cylinder located on the upstream side of the dam and in communication with the downstream body of water through a pipe conduit 12, of say approximately one-half inch diameter, which causes water to rise in said tank 11 to the same level 10$^a$ as the surface 10 of the down stream body of water; and obviously the difference between the depths of water from the orifice 8 to the levels 9 and 10 (or 10$^a$) would represent the "head" of water above the orifice.

13 designates a pair of meter supporting floats which are adapted to be floated by the upstream body of water and are supplied with upright rods 14 attachable at their upper ends to a cross-supporting element 15, on which the meter box casing 16 is suitably mounted. The ends of the element 15 are bifurcated to slidingly encompass depending guide arms 17 adapted to project over the actual upstream body of water, or the equivalent compartment of a "settling well" when employed, the depending arms 17 comprising angularly disposed continuations of base arms 18 supported by the ditch bank. 19 are simply brace bars for the general open framework construction of this hanger support. No claims being made to any of the details thus far specifically described, separately from their possible combination with other elements embodying my improvements, their actual formation and arrangement may be suitably altered as desired.

One wall of the meter box casing is longitudinally apertured and closed by an elongated transparent element 20, for reading the registering counter, while another wall has a smaller aperture towards its lower end which is transparently closed, for reading the indicator scale, as designated in dotted lines at 21 of Fig. 2. The bottom 22 of the meter box casing is detachably connected to the vertical walls thereof in any suitable manner. Although not so shown in the drawings, the bottom 22 is in reality slightly inclined relatively to said vertical walls, so that the longitudinal surfaces of certain elements of the internal mechanism, carried thereby and hereinafter referred to in detail, will be disposed in substantially true vertical planes when the meter box is floated.

The bottom 22 is also provided with a restricted slot 23 for the passage of the reciprocating scale indicator bar, and encompassing said slot 23 is a short depending hollow section 24. This section 24 is complementally associated with a detachable depending longer hollow section 25, which is closed at its bottom and provided with a small aperture 26 for the passage of an actuating rod adjustably connected to the lower end of the scale bar. The two said hollow sections are adapted to be connected at their abutting ends and a seal is effected therebetween by suitable means indicated at 27, thus permitting of proper adjustments being made by authorized persons but preventing outside tampering with, as it is apparent that the said hollow sections provide a sealed housing for the depending end of the scale bar.

The aforesaid indicator scale bar is designated at 29 and its lower end terminates in a right-angular bend 28 apertured to receive the threaded end of an actuating rod 30, coupling it with a "scale-bar" float 31 adapted to be floated in the tank 11. The adjustable connection between the threaded end of said coupling rod and the scale bar is effected through lock nuts 32, but it is obvious that the form of these connections are merely details changeable at will.

The scale bar 29 is reciprocatingly guided in the meter box by the slot 23, in the casing bottom, and a slotted bracket 33, which latter may be supported in any suitable way although it is shown as being mounted on a motor frame hereinafter referred to.

One face of the scale bar 29, which is opposed to the transparent closure 21, is supplied with a properly graduated surface, associated with a fixed pointer 34, for indicating the rate of discharge in second-feet, as will be clearly understood from Fig. 1. This graduated or scale surface is designated by the numeral 35.

36 represents a framework support for any suitable motor that is so time controlled as to impart one complete revolution, during any working hour of time, to a rotatable element, the said rotatable element in turn having a radially variant contact driving surface for the purpose hereinafter appearing. A standard eight-day clock train mechanism, generally indicated at 37, serves very satisfactorily for such a motor, while an elongated parabolically tapering spindle, indicated at 38, likewise serves very satisfactorily for the rotating element.

In the drawings, therefore, I have illustrated such means for a specific satisfactory disclosure, although I do not necessarily limit myself to their detailed use.

39 designates the minute hand arbor of the clock-train mechanism and 40 the winding studs therefor, the latter being operated by suitable elongated keys 41 extending through the top of the meter casing.

42 designates an upright bracket support, mounted on the motor frame and having a transversely disposed upper member 43 which is provided with a bearing aperture disposed in vertical alignment with the minute hand arbor 39 of the clock train mechanism.

44 is a short shaft fixed to the base of said tapering spindle 38 in axial alignment therewith, the upper portion of said short shaft being journaled in the bearing aperture of said bracket member 43 and the lower end thereof being operatively connected to said minute hand arbor shaft 39, which will obviously cause the rotation of said tapering spindle 38 one complete revolution each sixty minutes of time, if the clock train mechanism is running.

A bracket support having a transverse base 45 and spaced arms 46 is secured, as by bolts 47, to the upper end of the scale bar 29 so as to project inwardly towards the spindle 38. Between the spaced arms 46 there is disposed a pivot rod 48 carrying a bodily swinging registering support, including a vertical extension 49 provided with a transverse balancing arm 50, which latter is provided with suitable weighting means 51 at its free end.

On the inside face of the pivotal extension 49 there is fixedly mounted a Veeder counter 52, or its equivalent, the projecting stud operating shaft 53 for its counting disks being supplied with a contact wheel 54, adapted to be held in rotatable engagement with the variant friction driving surface of said tapered spindle 38, by the weighted arm 50, while at the same time being operative longitudinally of said spindle 38 by the reciprocating scale bar 29, the actuation of which latter is effected by its supporting float 31.

Before going into a more detailed statement of operation, which is fairly apparent from the foregoing, it may be said that the head of water and the size of the orifice 8 must necessarily determine the "second-feet" and ultimately the "acre-feet" discharged through the submerged orifice.

Also it is believed to be manifest that, as the meter box is supported by the floats 13 on the upstream level and the indicator bar 29 being supported by the float 31 on the downstream level, reverse relative motions will be imparted thereto as the levels vary, and as the "head" is governed by the difference between the upstream and downstream levels, it follows that the head on the orifice 8, at any time, may be readily ascertained through the medium of a scale on the indicator bar associated with a pointer carried by the meter box, or vice verse. Therefore, as the size of the submerged orifice 8 is a known constant while the flotation of the indicator bar is an absolutely positive one, it likewise follows that the scale on the indicator bar 29 may readily be graduated, after proper computations, to visually indicate at any time the rate of discharge in "second-feet" instead of the head on the submerged orifice.

This is the primary functioning of the indicator bar 29, but it is to be carefully noted that it also serves an important additional new and useful purpose in combination and conjoint co-operation with the registering mechanism for measuring the "acre-feet," or fractions thereof, in that the said indicator bar itself carries the counter element 52 and, therefore, directly and positively causes it to travel contiguously of the radially variant friction surface of the time-controlled rotatable element, the combination being broadly and specifically novel in the art, in so far as I am aware, and the operation of which specific combination will now be set forth.

As has been before stated, it is desirable that the bottom 22 of the meter box casing be slightly inclined relatively to the vertical walls thereof, so that the elongated parabolically tapering surface 38$^a$, which is the peripheral surface of the spindle 38, as well as the indicator bar 29 may be slightly tilted to positions approximating parallelism with the vertical walls of the meter box casing, and hence will be disposed in substantially vertical planes when the device is set up in operative position.

In Fig. 1 the indicator bar shows a rate of discharge of 1.4 "second-feet," but it will be understood that the patent drawings are not made to an exact scale, with reference to the several elements, and with the counter mechanism situated so near the apex of the spindle 38 the rate of discharge in reality would only be about 0.8 "second feet."

As the surfaces 9 and 10 of the upstream and downstream bodies of water, respectively, approach a common level, it is apparent that the discharge will proportionately decrease and the revolutions of the counter disks likewise slowed down, as the head of water on the submerged orifice is diminished, until the zero mark is reached, when the casing of the counter 52 will ride against the surface 38ª near the top of the spindle 38, while the counter actuating wheel 54 will pass above and over the apex of the spindle—and hence out of contact with the driving surface thereof, the counter being thus thrown out of operation. Reversely, as the head of water is increased, the upstream and downstream levels are proportionately varied and the relative longitudinal play of the meter box and indicator bar will cause the wheel 54 to gradually shift its position downwardly of the spindle 38, whereupon its speed of rotation is commensurately greater owing to its frictional engagement with the increasing diameters of the frictional driving surface 38ª, and hence the volume of water actually passing through the submerged orifice will be properly registered in "acre-feet," it being borne in mind that the driving spindle 38 is so time-controlled as to turn around its axis one complete revolution in every hour. During the variable reciprocating movement of the counter device 52, contiguously along the driving frictional surface of the spindle 38 in either direction, the weighted arm 50 serves as a compensating means for the longitudinal curvature of the surface 38ª and will hold the counter's wheel 54 in proper frictional engagement therewith.

Also, it has before been suggested that in some cases the meter box is not floatably supported at all, and an instance of this may be broadly referred to with reference to a weir damming arrangement, where the meter box is fixedly supported and only the reciprocating bar 29, carrying the registering counter 52, is flotatably associated with the crest of water above the weir. In this case, it will also be obvious that variations in the "head" or crest of water at the weir, and hence the rate of discharge in second-feet thereover, may likewise be readily readable from a properly computed scale on the indicator bar 29, as has already been explained with reference to the submerged orifice 8.

Thus it will be seen that I have devised a novelly combined mechanism, of a minimum number of working parts operating with maximum efficiency, whereby not only are the "acre-feet" of water delivered to the consumer properly registered but also the variable rate of discharge in "second-feet," at any time, is visually indicated on a positively reciprocated scale bar, which in turn directly carries and thereby positively shifts the counter device bodily with reference to its time-controlled variable friction driving element, avoiding all flexible connections and intermediate detailed parts so liable to get out of order or to otherwise improperly function. Analogously, by the employment of other satisfactorily computed and designated units of measurement than "acre-feet" and "second-feet," the quantitative volume and rate of discharge of other flowing liquids could likewise be measured, should such occasions for usage arise in the future.

However, while I have thus made a detailed disclosure of a practical embodiment of my improvements as associated with one system of measurement for flowing liquids, it may be found later to be expedient or desirable to make minor changes both in the form and structural arrangement of the combined elements, although without departing from the underlying principles of the invention, and it will be understood, therefore, that I do not necessarily limit myself to the exact details of construction and arrangement of parts as illustrated and described, excepting as they may come within the purview of the ensuing claims when fairly interpreted in the light of the specification and understood equivalents.

What I do claim, as new and patentable, is:—

1. In a structure of the character described, a float supported casing carrying a time controlled driving mechanism, a float actuated bar extending upwardly through the base of the casing and guided in its motion therein, recording mechanism carried by said bar and contacting with a portion of said driving mechanism to be driven thereby.

2. In a structure of the character described, a float supported casing carrying a time controlled driving mechanism, a bar extending upwardly through the base of the casing and guided in its motion therein, a float connected to said bar and arranged to cause differential movement between the bar and casing, recording mechanism carried by the bar and contacting with a portion of the driving mechanism to be driven thereby.

3. In a structure of the character described, a casing, a removable base in said casing, buoyant means for supporting said structure on a fluid, escapement controlled driving means on said base, means driven thereby and capable of transmitting to another driven member various rates of rotation, upon being driven at a constant speed, a bar passing through said base, buoyant means supporting said bar on a fluid, and registering means pivotally mounted on said bar, said registering means having a rotatable part engaging said first named driven means and capable of being rotated at various rates, dependent upon its point of contact with said first named driven means.

4. In meter mechanism of the type disclosed, the combination of a meter box, having an apertured bottom, containing a time controlled rotary element providing a radially variant driving face, a rectilinearly reciprocating vertical bar, extending at its upper end within said meter box through said apertured bottom, a registering counter, including an actuating element, so pivotally and rotatably supported directly on the upper end of said vertical bar, within said meter box, as a complete bodily whole and constant unit of said bar, that its actuating element is normally held in operative association with the driving face of said rotary element, an actuating rod adjustably connected to and supporting said vertical bar, and a float supporting said actuating rod, substantially as described.

5. In meter mechanism of the type disclosed, the combination of a float supported and time controlled rotary element providing a radially variant driving face, a float supported rectilinearly reciprocating vertical bar, and a registering counter, including an actuating element, so mounted on said bar, that its actuating element is normally held in operative association with the driving face of said rotary element, substantially as described.

6. In meter mechanism of the type disclosed, the combination of a float supported meter box, having an apertured bottom, a time controlled rotary element, providing a radially variant driving face, supported within said meter box to be floated therewith, a float supported rectilinearly reciprocating vertical bar, extending at its upper end within said meter box through said apertured bottom, and a registering counter on said vertical bar towards the upper end of the latter, which registering counter has an actuating element normally held in operative association with the driving face of said rotary element, substantially as described.

In testimony whereof, I affix my signature.

GAIRALD H. GARRETT.